United States Patent
Wade et al.

(10) Patent No.: US 10,455,026 B2
(45) Date of Patent: Oct. 22, 2019

(54) VIRTUALIZED DISTRIBUTED CONTENT ACCESS SYSTEM

(71) Applicant: Qnext Corp., Concord (CA)

(72) Inventors: Richard Greg Wade, Toronto (CA); David Darren Fletcher, Whitby (CA)

(73) Assignee: Qnext Corp., Concord (CA)

( * ) Notice: Subject to any disclaimer, the term of this patent is extended or adjusted under 35 U.S.C. 154(b) by 263 days.

(21) Appl. No.: 15/372,372

(22) Filed: Dec. 7, 2016

(65) Prior Publication Data

US 2017/0318096 A1 Nov. 2, 2017

Related U.S. Application Data

(60) Provisional application No. 62/329,271, filed on Apr. 29, 2016, provisional application No. 62/329,285, filed on Apr. 29, 2016.

(51) Int. Cl.
*H04L 29/08* (2006.01)

(52) U.S. Cl.
CPC ............ *H04L 67/141* (2013.01); *H04L 67/02* (2013.01); *H04L 67/06* (2013.01); *H04L 67/10* (2013.01); *H04L 67/1097* (2013.01); *H04L 67/20* (2013.01); *H04L 67/2833* (2013.01); *H04L 67/303* (2013.01)

(58) Field of Classification Search
CPC ..... H04L 67/02; H04L 67/06; H04L 67/1097; H04L 67/141; H04L 67/303; H04L 67/10; H04L 67/20; H04L 67/2833
USPC .......................................................... 709/201
See application file for complete search history.

(56) References Cited

U.S. PATENT DOCUMENTS

| | | | | |
|---|---|---|---|---|
| 7,945,618 B2 * | 5/2011 | Asher | ...................... | H04L 29/06 709/204 |
| 8,825,812 B2 * | 9/2014 | Asher | ...................... | H04L 65/60 709/203 |
| 2001/0103998 | | 8/2002 | DeBruine | |

* cited by examiner

*Primary Examiner* — Michael C Lai
(74) *Attorney, Agent, or Firm* — Alex Porat

(57) ABSTRACT

A system allowing a user to virtually aggregate the user's digital content from various operating system (O/S) accounts on disparate computer systems for subsequent access via a single dashboard. The system includes a central service administrator (CSA) and a passive content server (PCS) installed in each computer system. The PCSs establish persistent connections with the CSA for the O/S account repositories which the user elects to aggregate. The user can then connect to the CSA over the Internet, receive a list of the selected O/S account repositories via the dashboard, and request content therefrom. The CSA utilizes the corresponding persistent connection to initiate transfer of the requested content from the PCS on the computer system hosting the requested content to the user.

18 Claims, 15 Drawing Sheets

Relational DB 180

| PID | UID | Psswd Token | Scheme | Display Name | DID | Connection | oAuth token | Favorites |
|---|---|---|---|---|---|---|---|---|
| 01 | A(george@jungle.com) | $^@ | PC | Home | ABCD | https i | | C:/docs/work |
| 02 | B(person@any.com) | *KH$*M | PC | Me | QRST | https x | | |
| 03 | A(george@jungle.com) | $^@ | NAS | Work | ABCE | https j | | N:/sales/projects |
| 04 | C(dude@here.com) | H&X!- | Mac | My iMac | WXYZ | | | |
| 05 | A(george@jungle.com) | $^@ | Google | My Cloud | | https y | xxyz | |

FIGURE 2

Authorization Code Table 342

| Code (id) | UID | Created | Expires |
|---|---|---|---|
| UNPCWM | george@jungle.com | 17-03-16 02:13:00 | 17-03-16 02:33:00 |

FIGURE 2A

Contact Table 444

| UID | CID | Name | Has Account |
|---|---|---|---|
| george@jungle.com | alex@place.com | Alex | False |
| george@jungle.com | michelle@place.com | Michelle | True |

FIGURE 2B

Account Validation 450

| Code/ID | Email | Created | Expires | Name | FromUID |
|---|---|---|---|---|---|
| OKAMCX | alex@place.com | 17-03-16 02:13:00 | 17-03-16 02:33:00 | Alex | george@jungle.com |

FIGURE 2C

Provider Share 460

| SID | PID | Virtual | Sharee (UID) |
|---|---|---|---|
| /ab3c/5def | ABCDEF | Pics | alex@place.com |
| C:/docs | ABCGHI | Docs | alex@place.com |

FIGURE 2D

VIRTUALIZED DISTRIBUTED CONTENT ACCESS SYSTEM

CROSS-REFERENCE

This application claims priority to U.S. Provisional Application No. 62/329,271 filed Apr. 29, 2016 and U.S. Provisional Application No. 62/329,285 filed Apr. 29, 2016, the contents of both of which are incorporated by reference herein in their entirety.

FIELD

This disclosure relates generally to the field of file storage technology.

BACKGROUND

In today's digital environment people store content on a variety of different devices. Traditionally, content was stored in private infrastructure such as corporate networks, which typically comprise personal computers (PCs) interconnected with one or more file servers over a local- or wide-area network. While various solutions exist for obtaining remote access to some content stored in private infrastructure, there is still no elegant solution for obtaining access to and/or sharing of any and every piece of content stored in private infrastructure. For example, there are no elegant solutions to obtaining remote access to data stored in the PCs located behind the firewall of a corporate network, short of synchronizing the data in the PCs with a network server (or enforcing corporate policy to preclude storing content on the PC in the first instance). Likewise, it is not convenient to remotely access content stored on one's firewalled home PCs outside the house. Furthermore, even if one is able to access such content, it is not convenient to share such content with third persons short of email or other file transfer solution.

In response to these issues, public infrastructure has become more prevalent over the past several years. This infrastructure, such as cloud storage provided to the public by services such as Google Drive™, Dropbox™, and Microsoft OneDrive™, allows individual consumers and/or organizations to store content on infrastructure owned by a third party, making it easier to access such content while mobile and/or share such content with third parties without having to email or otherwise transfer the content between devices. The problem with public infrastructure, however, is that for this solution to be truly effective the content must be stored on the public infrastructure which is troublesome if the majority of one's content is in fact stored on private infrastructure because of the necessity and inconvenience of synchronizing content between public and private infrastructure. There is an also an issue with respect to the security risks that can arise in trusting a third party to secure one's important confidential information.

Consequently, with the prevalence of public infrastructure such as cloud storage, the prevalence of private infrastructure such as PC networks and network storage devices, and the prevalence of mobile devices such as laptops, tablets and smart phones, a person, and more particularly an organization, typically stores content on a wide variety of different systems and devices It would be desirable, therefore, to have a system which allows users to access and share content from any device, whether the content is stored on servers, PCs, public cloud storage, file transfer protocol (FTP), network attached storage (NAS) and storage area network (SAN) devices.

SUMMARY

Generally speaking, the system described herein allows content to be accessed and shared from their source locations without having to upload the content to a central server or any third party service provider.

The system provisions a single sign-on, where a user can have access to all the content that matters to the user via a single dashboard, whilst allowing the user to access his or her content no matter when the content is needed or where the content is physically stored. This capability can make it easier for the user to start work on one device and finish it on another.

The system can allow a user to share large, uncompressed files, including documents, video, hi-resolution images, music, presentations, and application files, with collaborators anywhere in the world, without any compression or degradation of file quality. Furthermore, the system can allow users to stream media directly to their mobile phone, tablet laptop or other communication device, as well as allowing users to share their collections and stream media with their contacts.

The system can further provide the ability to search all of a user's devices and accounts from one intuitive single dashboard.

According to a first aspect of the invention, a virtualized content access (VCA) system is provided. The VCA system includes: a central service administrator, which is configured to enable a user to register a VCA account with the central service administrator; a plurality of private infrastructure content providers, wherein each private infrastructure content provider includes a passive content server and at least one content repository defined/controlled by an operating system (O/S) account, wherein at least two of the private infrastructure content providers are disparate from one another in that they are located in different Internet domains and utilize different operating systems. The central service administrator and the passive content servers are configured such that: a registered VCA user can select one or more O/S account repositories from at least two disparate private infrastructure content providers for inclusion in a VCA collection associated with the registered user; and for each selected O/S account repository a persistent connection is established between the central service administrator and the passive content server associated with the selected O/S account repository. The central service administrator maintains a relational database linking each registered VCA user with the registered user's selected O/S account repositories and the persistent connections corresponding thereto. In the VCA system a registered user can, use a communication device to connect to the central service administrator over the Internet and, upon VCA account authentication, receive a list of the O/S account repositories associated with the registered user's VCA collection and request content therefrom. In response, the central service administrator identifies the PCS and the persistent connection associated with the O/S account repository containing the requested content and signals the identified PCS over the identified persistent connection to initiate transfer of the requested content from the identified PCS to the registered user's communication device.

Any of the private infrastructure content providers can be a personal computer, a network server, a network attached storage device, a storage attached network, or a router/network appliance.

The persistent connections are preferably established outbound from the passive content servers to the central service administrator.

The central service administrator is preferably provided by a cluster comprising at least one public facing server and at least one content adapter server. The at least one public facing server accepts connections from the public including registered users. The at least one content adapter server does not accept connections from the public. The at least one public facing sever and the at least one content adapter server may be provisioned on two separate machines separated by a firewall which inhibits the at least one content adapter server from receiving connections other than from the at least one public facing server and the passive content servers.

The registered user's communication device can be connected to one of the at least one public facing servers and in retrieving the requested content, the connected-to public facing server can transmit a wake signal to the identified passive content server over the identified persistent connection, wherein the wake signal includes a URL pointing to one of the least one content adapter servers, and wherein upon receipt of the wake signal, the identified passive content server opens a semi-persistent control channel to the pointed-to content adapter server.

The semi-persistent control channel may elapse after a pre-configured time-out period.

The pointed to content adapter server can issue a command to the identified passive content server over the semi-persistent control channel to retrieve metadata concerning the requested content. In response to the metadata command, the identified PCS can transmit directory path information over the semi-persistent control channel to the pointed-to content adapter server, the pointed-to content adapter server can transmit the directory path information to the connected-to public facing server, and the connected-to pubic facing server can transmit the directory path information to the registered user's communication device.

The requested content can include a file, in which case the pointed-to content adapter server can issue a command to the identified passive content server over the semi-persistent control channel to retrieve the file. Upon receipt of the command to retrieve file, the identified passive content server can open a data channel connection to the pointed-to content adapter server and transmits the file to the pointed-to content adapter server over the data channel, the pointed-to content adapter server conveys the file to the connected-to public facing server, and the connected-to public facing server transmits the requested content to the registered user's communication device. A data channel connection can be opened per command to download a file.

The VCA system can also include a public cloud storage system that includes account repositories, the access to which is controlled by security credentials associated with a public cloud system account. The central service administrator can be configured to enable the registered user to select on or more public cloud storage system account repositories for inclusion in the registered user's VCA collection. In this case, the central service administrator maintains associations in the relational database between registered users and authorization tokens enabling access to the public cloud storage system account repositories.

The central service administrator can enable the registered user to select content in the registered user's VCA collection that the registered VCA user is willing to share with one or more sharees. The central service administrator can send an email to a sharee with a URL link pointing to the central service administrator for retrieving the shareable content.

A new sharee who is not registered with the VCA system can retrieve the shareable content by activating the URL link without having to register with the VCA system. In this case, the central service administrator can establish a VCA account for the new sharee with a temporary password which is transmitted to the new sharee. The new sharee can be required to use the password or a replacement therefor to subsequently retrieve the shared content.

When the URL link is activated by a sharee communication device, the central service administrator can identify the persistent connection and the passive content server associated with the O/S account repository containing the shareable content and signals the share-identified passive content server over the share-identified persistent connection to initiate transfer of the shareable content from the share-identified passive content server to the sharee communication device.

In retrieving the shareable content, the central service administrator can transmit a wake signal to the share-identified passive content server over the share-identified persistent connection, wherein the wake message includes a URL pointing to a content adapter server. Upon receipt of the wake message, the share-identified passive content server opens a semi-persistent control channel to the share-identified content adapter server. The content adapter server can issue a command to the share-identified passive content server to retrieve metadata concerning the shareable content. In response to the metadata command, the share-identified passive content server can transmit directory path information over the semi-persistent control channel to the content adapter server, which transmits the directory path information to the sharee communication device via a public facing server. The content adapter server can also issue a command to the share-identified passive content server to retrieve a file. Upon receipt of a command to retrieve a file, the share-identified passive content server may open a data channel connection to the content adapter sever and transmit the requested file to the content adapter server, which conveys the requested file the sharee communication device via a public facing server.

BRIEF DESCRIPTION OF DRAWINGS

The foregoing and other aspects of the invention should be better appreciated with reference to the more detailed description of one or more embodiments thereof and the following drawings, wherein:

FIGS. 2, 2A, 2B, 2C, and 2D are examples of tables employed by a relational database managed by the embodiment of the virtualized content access system;

FIG. 6 is an image of a screen display associated with the graphical user interface employed by the embodiment of the virtualized content access system, relating to user log-in;

In the drawings, different elements are typically labeled with different reference numbers. Instantiations of identical elements may have alphabetical suffixes appended to the reference number in order to identify specific instances of the element.

DESCRIPTION

1.0 Definitions

Figure 1:
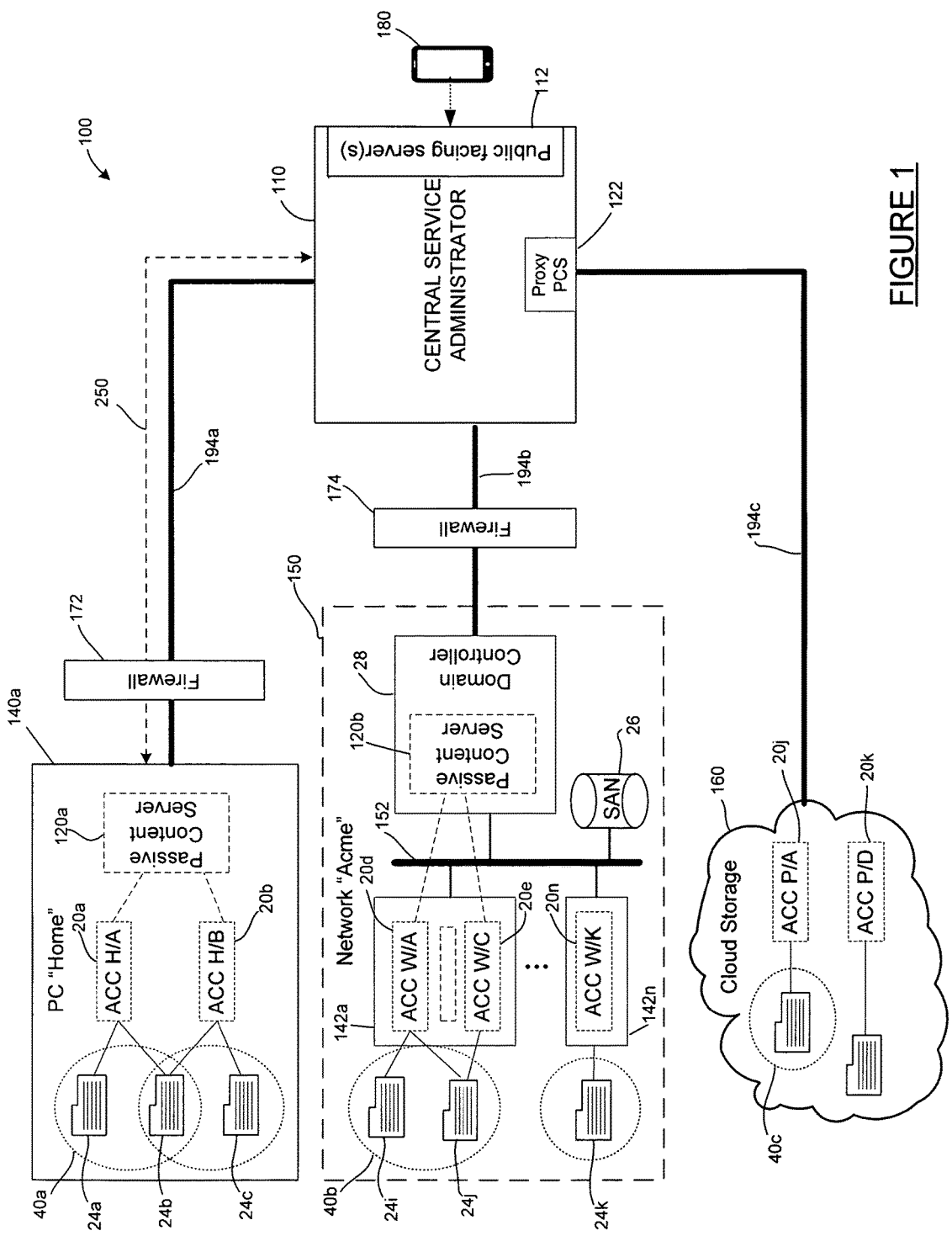
FIG. 1 is block system diagram of a virtualized content access system, according to one embodiment of the invention.

In this document, unless the context clearly dictates otherwise, the following terms and/or abbreviations have the following meanings:

"central service administrator", "central administrator" or "CSA" means a centralized element of a VCA system that provides, inter alia, administration and management functions;

"content" means digital files such as documents, executables, pictures, audio, video;

"content metadata" means information about content, such as directory information relating to the content;

"content provider" or "CP" means the equipment which hosts an O/S account repository, such as but not limited to, a PC, network storage, cloud storage;

"content repository" or "repository" means, in a general sense, a collection of content associated with a user on a particular device or system;

"new user" means a consumer of a VCA system that has not yet established an account with a VCA system;

"O/S account repository" means a collection of content defined by a user's access rights thereto through an account in the native operating environment, such as the files accessible via a Windows™ user account or the files accessible via a consumer's public cloud storage account;

"passive content server" or "PCS" means an element of a VCA system resident on private infrastructure content providers which, in general, facilitate the VCA function, and more particularly, provide and maintain a persistent connection between the private infrastructure content provider and the central service administrator;

"public infrastructure" means equipment which predominantly hosts public IT services such as cloud storage;

"private infrastructure" means equipment which predominantly hosts private IT services, for example, a corporate network;

"registered user" means a validated user that has established an account with a VCA system; and "SAN" means storage area network;

"virtualized content access" or "VCA" means an application, function or sub-system that enables a user to aggregate a variety of O/S account repositories from a variety of discrete content providers so that the user can access the corresponding content therefrom via a single dashboard on any device connected to the Internet capable of executing a conventional web browser; and "VCA collection" means a virtual aggregation of O/S account repositories for a particular registered user.

2.0 Introduction

Generally speaking, the virtualized content access (VCA) system described herein allows a registered user (which term includes an organization or collection of people) to remotely and securely connect to and use any and all content stored by the user no matter where the content physically resides and use this content from any device, from a single common interface, from any location, through an internet connection. The content can be used in the sense that it can be, inter alia, accessed, retrieved, streamed and likewise shared with others, as well as managed remotely such as by copying, pasting, uploading and deleting portions of the content. The VCA system abstracts and virtualizes O/S account repositories to render them independent of their physical location, enabling the user to use the content thereof as if it was local to the physical device currently being used by the user. In this manner users can securely access or provide access to any of their content using an internet connection from any general location.

Figure 3A:
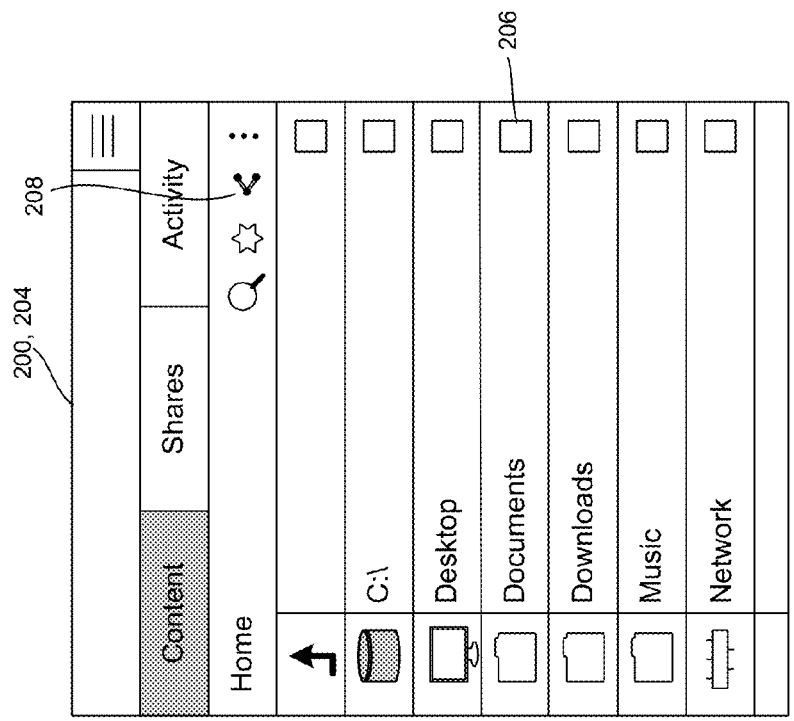
FIGS. 3, 3A, 3B and 3C are images of screen displays associated with a graphical user interface employed by the embodiment of the virtualized content access system, relating to the accessing and/or sharing content contributed to the system.
Figure 3:
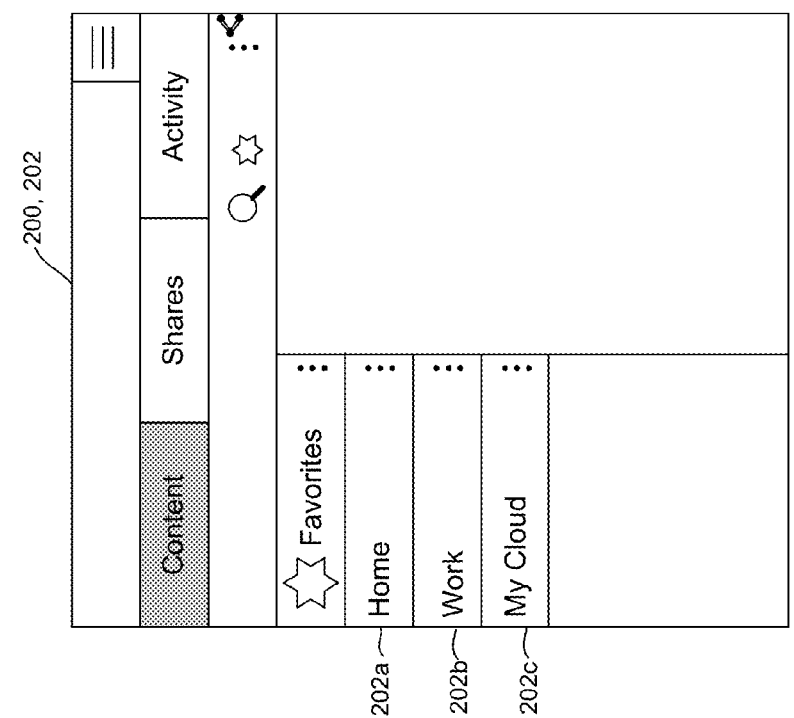
Figures 1, 13:
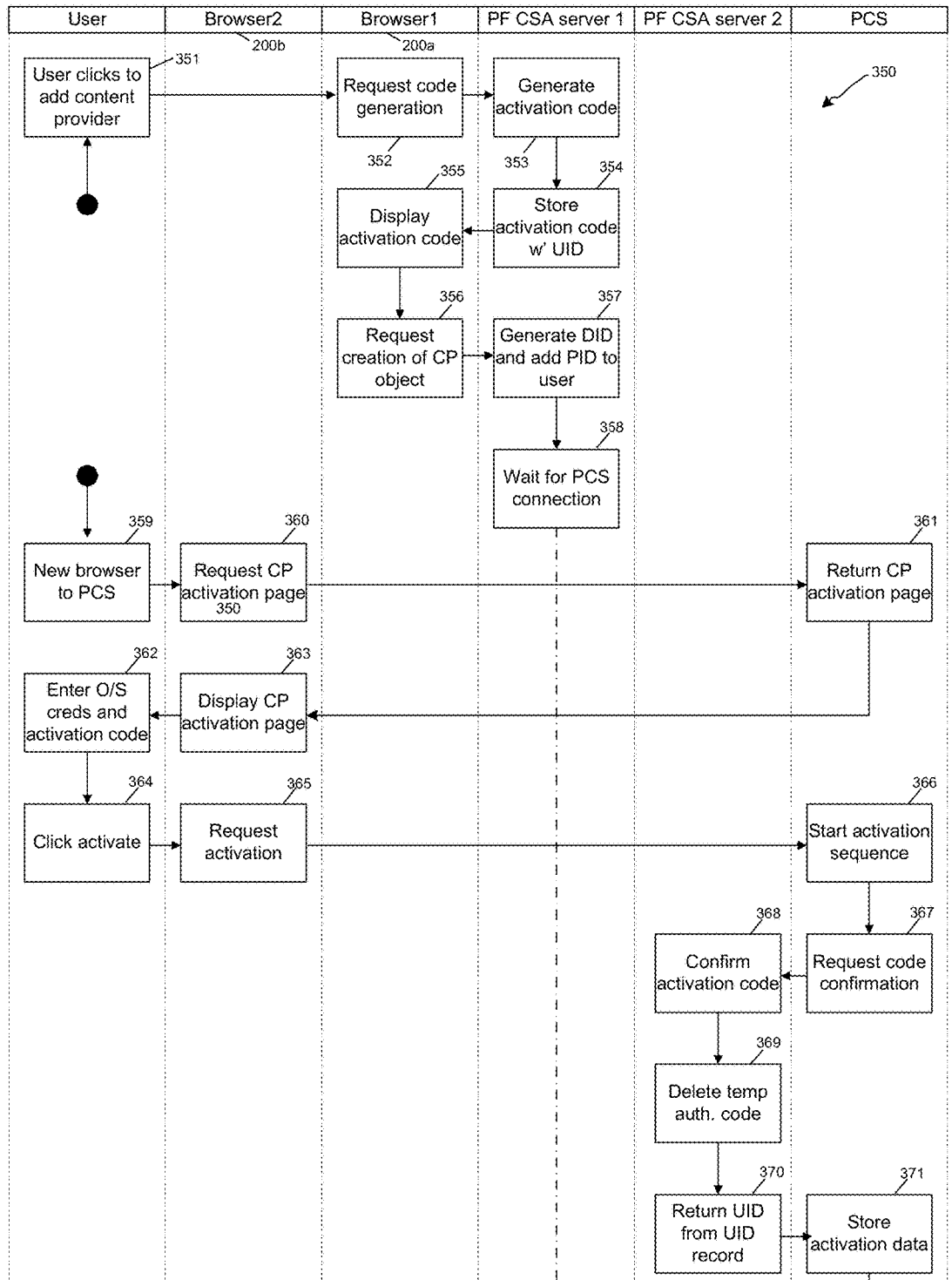
FIG. 13, which is comprised of FIGS. 13-1 and 13-2, is a flowchart illustrating a workflow which enables a registered user to contribute a content repository to the embodiment of the virtualized content access system.
Figures 2, 13:
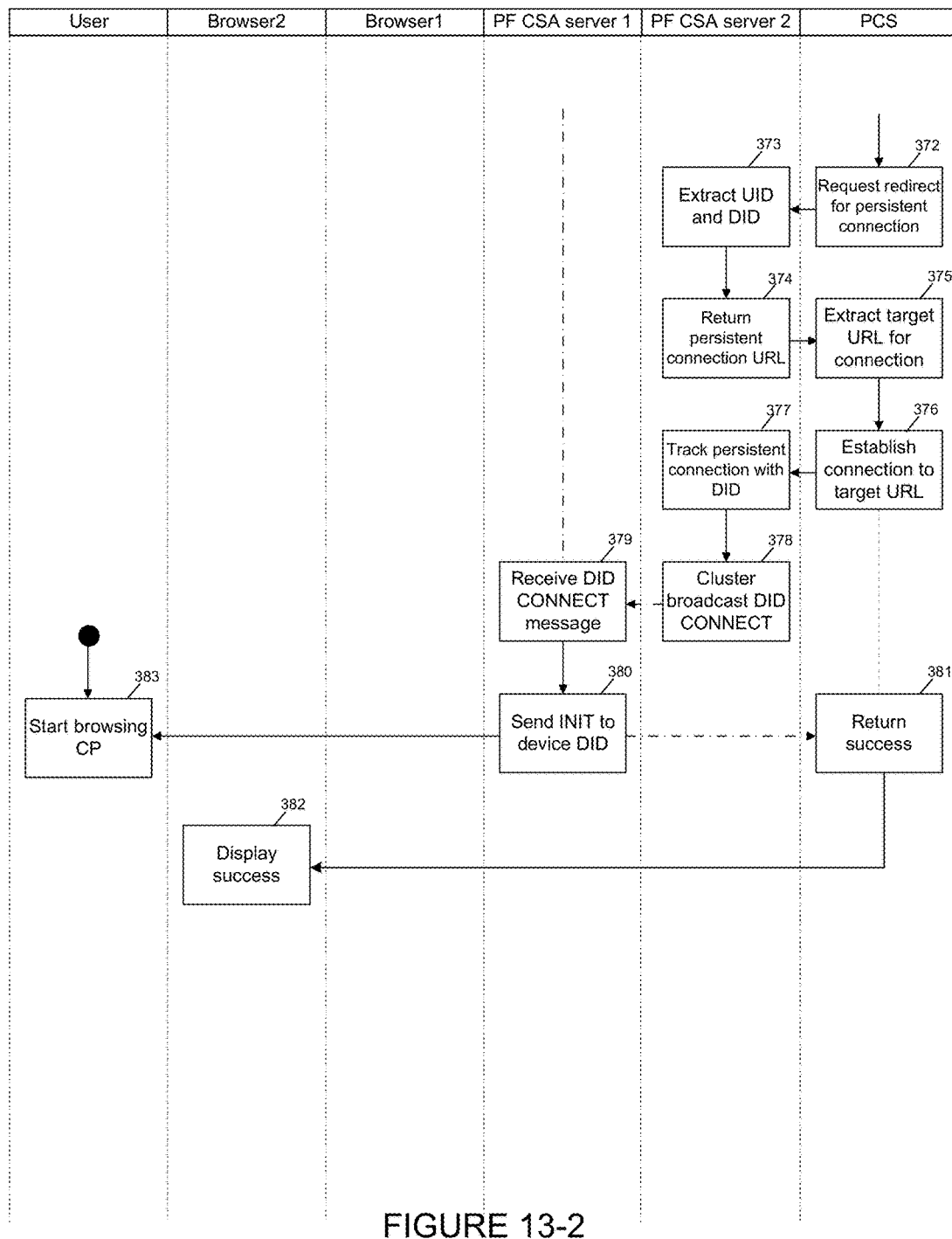

FIG. 1 shows an example of a VCA system 100 with respect to a registered user, designated herein as "user A", who has configured the VCA system 100 to aggregate a plurality of content repositories as described in greater detail below into a particular VCA collection, as shown in FIGS. 2 and 3. It will be understood that other registered users can likewise configure the VCA system 100 to aggregate the same and/or other content repositories to create other VCA collections.

The basic elements of the VCA system 100 include: (i) a centralized service administrator (CSA) 110 and (ii) modules, referred to herein as passive content servers (PCS) 120, which are integrated with or otherwise executed by various private infrastructure devices, such as personal computers, file servers, NAS devices or SAN devices, which contain or otherwise provide access to the content repositories.

The central service administrator 110 includes a public facing web server 112 (that may be implemented via a machine cluster), which provides a graphical user interface (GUI) 200 for accessing the VCA system 100. A similar GUI is provided by the passive content server 120. An example of an initial window 202 of the GUI is shown in FIG. 3, which shows the O/S account repositories corresponding to user A's VCA collection under discussion.

Referring to FIGS. 1-3, user A's VCA collection is derived from three distinct content providers: a personal PC 140a, named "Home", located at user A's home; a corporate network 150, named "Acme", located at an office building where user A works; and a public cloud storage service 160, location unknown, where user A stores some personal and some work information.

The Home PC 140a executes a conventional operating system such as Microsoft Windows™ or Apple OS™, which allow multiple operating system user accounts. In this example user A has an account H/A (schematically represented by stippled container 20a) on this PC 140a and another user B has a separate account H/B (schematically represented by stippled container 20b) on the PC 140a which account is used by user A's family. Each user account H/A 20a and H/B 20b has access to various content, (schematically represented by directory folders 24), some of which may overlap between the accounts 20a and 20b and some of which may be exclusive to the user account 20a. In this particular example, registered user A has contributed the O/S account repository (schematically represented by stippled container 40a) defined/controlled by O/S account H/A 20a to user A's VCA collection.

The Acme corporate network 150 includes a local area network (LAN) 152 as known in the art to which are connected multiple PCs 142a, 142b, . . . 142n, a SAN 26 and a domain controller 28. The domain controller 28 manages user accounts across the corporate network, providing each user with access to various content such as various files, some of which may overlap between users and some of which may be exclusive to the user account. In the illustrated example one of the PCs 142a includes local storage such as a hard disk to which registered user A and another person C have access to various content thereon through corporate accounts W/A (schematically represented by stippled container 20d) and W/C (schematically represented by stippled container 20e), respectively. Likewise the users of the corporate network have access to various content stored on the SAN 26. In this particular example, registered user A has contributed the O/S account repository defined/controlled by O/S account W/A 20d (schematically represented by stippled container 40b) to user A's VCA collection, which repository comprises files stored on the local drive of PC 142a and files stored on the SAN 26.

Registered user A also has an account P/A (schematically represented by stippled container 20j) on the public cloud storage 160. User A has access to only certain limited content stored in the public cloud through user A's account P/A 20j. In this particular example, registered user A has contributed the public cloud account repository defined/controlled by the cloud account P/A 20j (schematically represented by stippled container 40c) to user A's VCA collection.

In the example of FIG. 1, the Home PC 140a and the Acme network 150 are located behind firewalls 172, 174 respectively. The Home PC 140a and PCs 142a, 142b, . . . 142n, in the Acme network 150 belong to completely different domains, the accounts thereof being inaccessible to one another through a domain controller, active directory or other such organizational access scheme. In other words, accessing user account H/A 20a will not provide user A with access to the content associated with account W/A 20d and vice versa. Moreover, the Home PC 140a and network 150 may be located on different IP sub-networks and use different organizational protocols such as provided by different operating systems.

The Home PC 140a has an instantiation 120a of the passive content server 120 executing thereon. The domain controller 28 in the corporate network 150 has an instantiation 120b of the passive content server 120 executing thereon. The inner workings of the public cloud 160 are inaccessible to the user, so a proxy 122 for a public infrastructure passive content server is provisioned through the central service administrator 110.

Generally speaking, a device or system which has or provides access to an O/S account repository that is virtually aggregated by the VCA system 100 is generically referred to herein as a content provider (CP). Content providers can be further classified as private infrastructure or a public infrastructure content provider. A device which is used merely as a communication device to access a content repository is referred to herein as a communication device (CD), it being understood that a CD can simultaneously be, but does not have to be, a content provider. For robustness the VCA system 100 is preferably deployed across the Internet such that CDs can communicate with the central service administrator 110 from anywhere there is Internet access. In the configured VCA system example of FIG. 1, the home PC 140a is a private content provider, the domain controller 28 is a private content provider, and the public cloud 160 is a public content provider. User A also has a mobile smart phone 180 which functions as the CD in the example of FIG. 1.

Referring to FIG. 3, the GUI window 202 for registered user A shows icons 202a, 202b, 202c for registered user A's VCA collection consisting of content repositories associated with: (i) account H/A 20a associated with the Home PC; (ii) account W/A 20d associated with the Acme corporate network 150; and (iii) account P/A 20j associated with the public cloud storage 160. These accounts are respectively labeled in the dashboard 202 as "Home", "Work" and "My Cloud", and may be named or labeled by the registered user as desired. The window 202 may be visible via a client app installed on the mobile phone CD 180 or by utilizing the mobile phone to access a web site where the public facing web server 112 provides a similar function. The same GUI window 200 may also be access via the PCs 140 which have passive content server 120 installed thereon, or by providing access to the public facing web server 112.

Actuating any of the O/S account repository icons 202a, 202b, 202c leads to subsequent windows showing the contents of the corresponding content repository; for example, actuating the Home icon 202a leads to subsequent GUI window 204 of FIG. 3A which enables the registered user A to see the content (such as the local drives) accessible via account H/A 20a on user A's home PC 140a. Likewise, registered user A can access the content available to the user through his or her work account W/A 20d and his or her public cloud account P/A 20j. By actuating various menu icons, registered user A may search for any content available to him or her through accounts H/A 20a, W/A 20d and P/A 20j, manage such content (including copy, paste, move, and delete content) across the accounts 20a, 20d, and 20j and their respective content providers, and share such content with a third party. An example of the functionally that can be provided by a VCA system is described in detail in U.S. Provisional Application Nos. 62/329,271 or 62/329,285 incorporated by reference herein, which include appendices that describe comprehensively the user interface of a commercial embodiment of the VCA system known as File-Flex™.

It should be appreciated that in the foregoing example the content repositories and their underlying content providers are disparate in the sense that they are located in different domains, and/or different IP sub-networks, and/or utilize different organizational protocols. The content providers in the foregoing example may also employ different native operating systems.

The ability to virtually aggregate disparate content repositories from disparate content providers is enabled when a new user establishes or registers an account with the central service administrator 110. The user can then install the passive content server 120 on each selected private content provider, which establishes a persistent connection to the central service administrator 110 and links the respective O/S account repository to the persistent connection with the central service administrator 110, as described in greater detail below. The central service administrator 110 functions as a kind of switchboard to interconnect a CD with a private content provider in a way that avoids problems with firewalls, as described in greater detail below, which generally do not admit incoming connections. Advantageously, no material user content has to reside or remain resident on the central service administrator 110 as it can function only as a transit node to convey encrypted content from the content provider to the CD.

FIG. 2 shows logical relationships in a relational database 180 managed by the central service administrator 110 which reflects in part registered user A's VCA collection discussed above with reference to FIGS. 1 and 3. (Many other registered user's VCA collections can be contained within the database 180.) Upon connection, each O/S account repository is assigned a unique identifier (PID) 182 and is relationally linked with a given registered user through a user identification (UID) 184, such as the user's email address, and his or her security credentials 186, preferably captured via a password token. The type of content provider (scheme) 188 as well as a user-provisioned display name 190 for the content provider (which may differ from the default name of the device as it appears in its native environment) are also recorded. The relational database 180 also links a private content provider with a corresponding persistent connection 194 identified by a device ID (DID) 192, or links a public content provider with an authorization token 196, as known in the art, which enables third parties to access content from another user's cloud account. Continuing with the example discussed heretofore, registered user A's account H/A 20a on the Home PC 140a has a PID of '01' and is linked with a particular persistent connection schematically identified by DID 'ABCD' corresponding to HTTPS connection 'i'. Likewise, registered user A's cloud storage account P/A 20j has a PID of '05' and is linked with a token 'xxyz', required for third party access to the account.

Referring to FIGS. 1-3, when registered user A utilizes a CD such as the mobile phone 180, the user connects to the central service administrator 110 via the Internet and uses his or her credentials to gain access to the GUI dashboard 200. As the central service administrator 110 maintains the relational database 180, the central service administrator 110 has sufficient information to populate and serve the GUI 200 dashboard with all the content providers that registered user A has contributed to his or her VCA collection. When the user actuates one of the content provider icons on the GUI dashboard, the central service administrator 110 utilizes the corresponding persistent connection or authorization token to initiate the retrieval of content, including metadata such as directory structure, from the corresponding content provider.

A more detailed exposition of a preferred manner of connecting content providers and providing remote access to the content in a VCA collection is now discussed.

3.0 Remote Access 3.1 Account Creation

Figure 4:
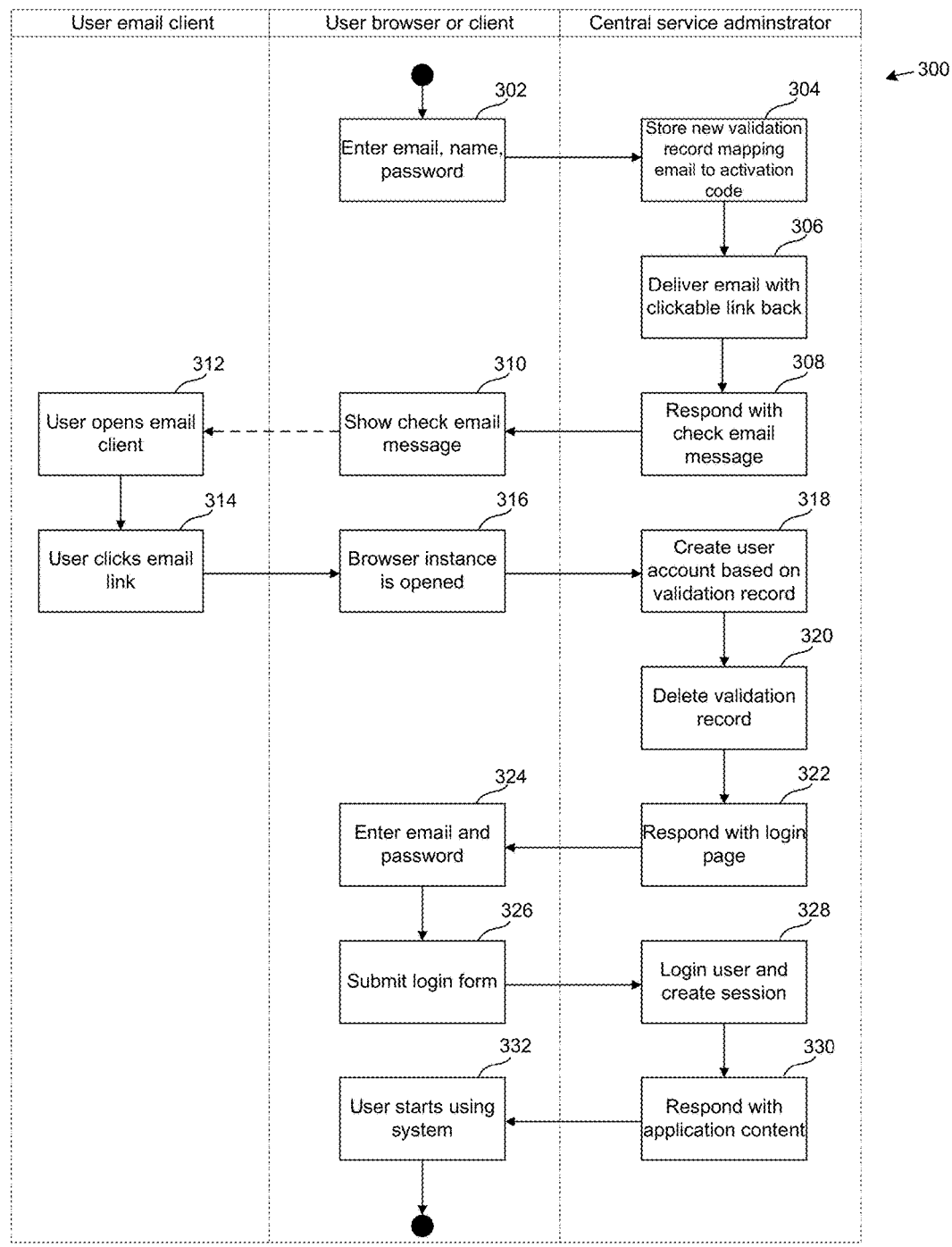
FIG. 4 is a flowchart illustrating a workflow that enables a user to register with the embodiment of the virtualized content access system.
Figure 5:
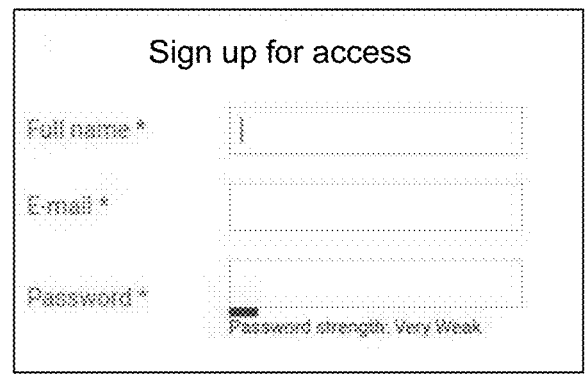
FIG. 5 is an image of a screen display associated with the graphical user interface employed by the embodiment of the virtualized content access system, relating to user registration.

Referring to flowchart 300 in FIG. 4, the VCA system 100 uses conventional email-based validation during account creation. When first utilizing the system 100 a new user is presented with an account creation screen 210, in which the user must provide his or her name, email address, and password, as seen for example in FIG. 5 and referenced in workflow step 302.

After the new user submits the account creation form, a temporary record is created in a validation table (not shown) maintained by the central service administrator 110 mapping the email address, password, and name to the unique activation code, as per step 304. The password itself is not stored, but rather a password hash value, such as provided by bcrypt algorithm, is stored making reverse engineering practically impossible.

Figure 6:
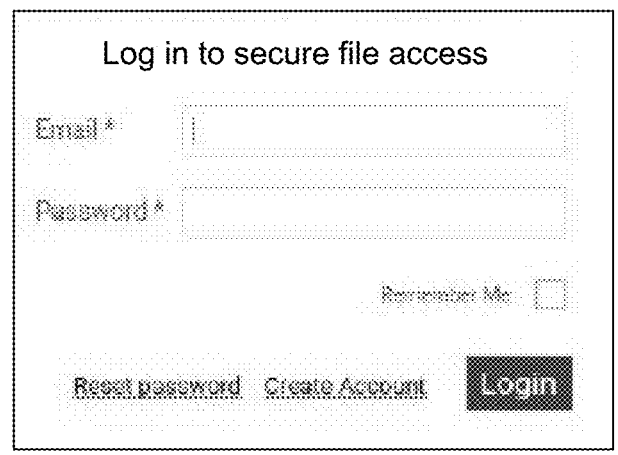

After submission for account creation, an email is delivered to the newly registered user's email account, as per steps 306-312. This email preferably includes a unique activation code that is used to bind the email address to the specifically-delivered email. Once the newly registered user clicks the link provided in the email, as per step 314, the account is validated and created for the newly registered user, with information copied from the validation table into the relational database 180, as per steps 316-320. The activation code is time limited with an expiration date. Once that expiration date passes, the system will deny the existence of the activation code and remove it from the validation table. Once the account is verified, the registered user may proceed with logging in to the VCA system 100, as indicated by screen display 212 of FIG. 6 and per steps 322-332.

3.2 Passive Content Server Activation

In order for the registered user to contribute a content repository on a private content provider, the user can install the passive content server 120 on the private content provider. This is assumed prior to following the sequence of events described below with respect to activating the corresponding content repository.

3.2.1 The Persistent Connection

To activate a content repository on a private content provider, the central service administrator 110 and the corresponding passive content server 120 utilize a temporary activation code to associate the content repository with a PID 182, which is itself associated with the registered user, and thus his or her email address via the UID 184.

Figure 7A:
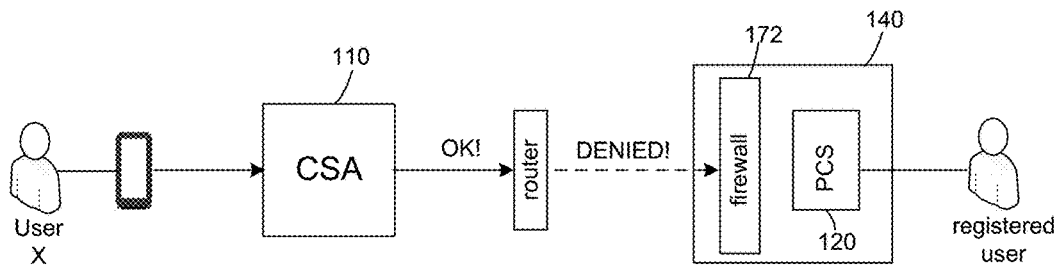
FIGS. 7A and 7B are schematic diagrams of different connection flows for accessing content contributed to the embodiment of the virtualized content access system, wherein the connection flow of FIG. 7A results in a denial of service and wherein the connection flow of FIG. 7B resulting in successful service.
Figure 7B:
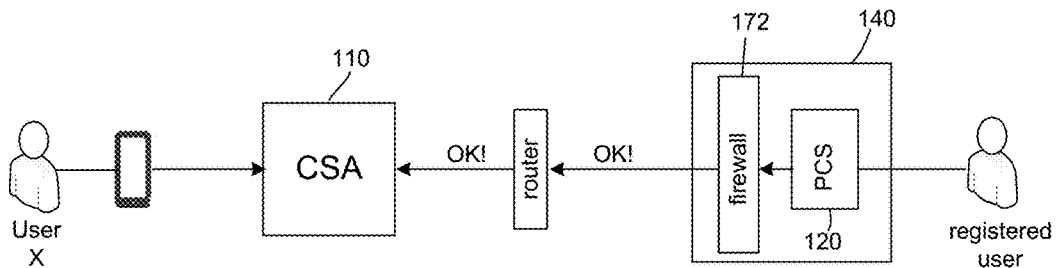
Figure 8:
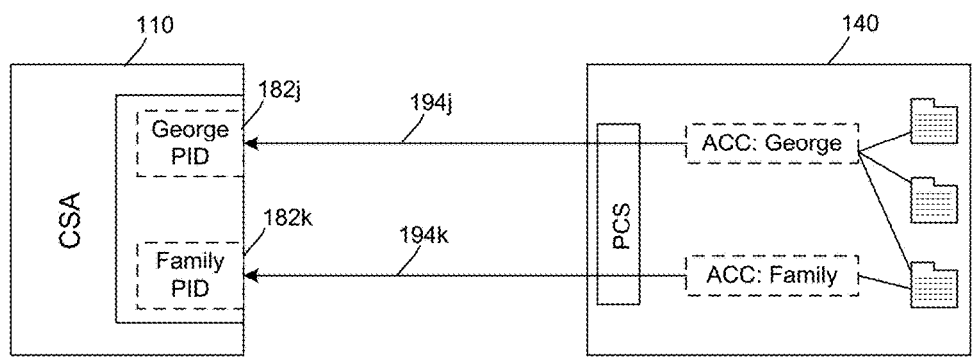
FIG. 8 is a schematic diagram illustrating logical relationships with respect to content contributed to the embodiment of the virtualized content access system.

Once activation is complete, the operating system account on the private content provider is effectively bound (i.e., married) to the email address/account in the central service administrator 110. The registered user of the VCA system will have access to the same content that the operating system user does. This marriage is consummated by a persistent HTTPS connection 194, established from the corresponding remote content provider towards the central service administrator, thereby avoiding most firewall blockages. FIGS. 7A and 7B contrast the role of firewalls (e.g., 172 or 174) depending on the direction of connection requests, wherein incoming connection requests from an unknown third party user X is blocked by the firewall (FIG. 7A) but outgoing connection requests to unknown user X are permitted by the firewall (FIG. 7B). As indicated in FIG. 1 and in another example shown in FIG. 8, each marriage has its own persistent connection 194, and thus access to a unique set of files on the target operating system (based on the operating system's permissions), as content access requests coming in to the passive content server 120 are executed by system threads that inherit the permissions of the associated operating system user. Thus, for example, the VCA system 100 shown in FIG. 1 features a persistent connection 194a between the home PC 140a and the central service administrator 110, and a persistent connection 194b exists between the corporate network 150 and the central service administrator 110. Likewise, FIG. 8 shows an example wherein a registered user contributes two O/S account repositories to a VCA collection, one repository associated with O/S account "George" and another with O/S account "Family", both accounts being active on the same PC 140b. A persistent connection 194j, 194k is provisioned for each O/S account repository, the connections being associated with unique corresponding PIDs 182j, 182k, respectively, in the relational database 180 of the central service administrator 110.

In order to keep persistent connections 194 alive, a periodic NOOP message is transmitted from the central service administrator 110 to each passive content server 120 every 25 seconds or so. This heartbeat is used to stop badly behaved Internet proxies from disconnecting an apparently inactive connection. It also serves as a method for the passive content server 120 to detect a dead connection, in order to establish a new one.

3.2.2 Architecture of Central Service Administrator

Figure 9:
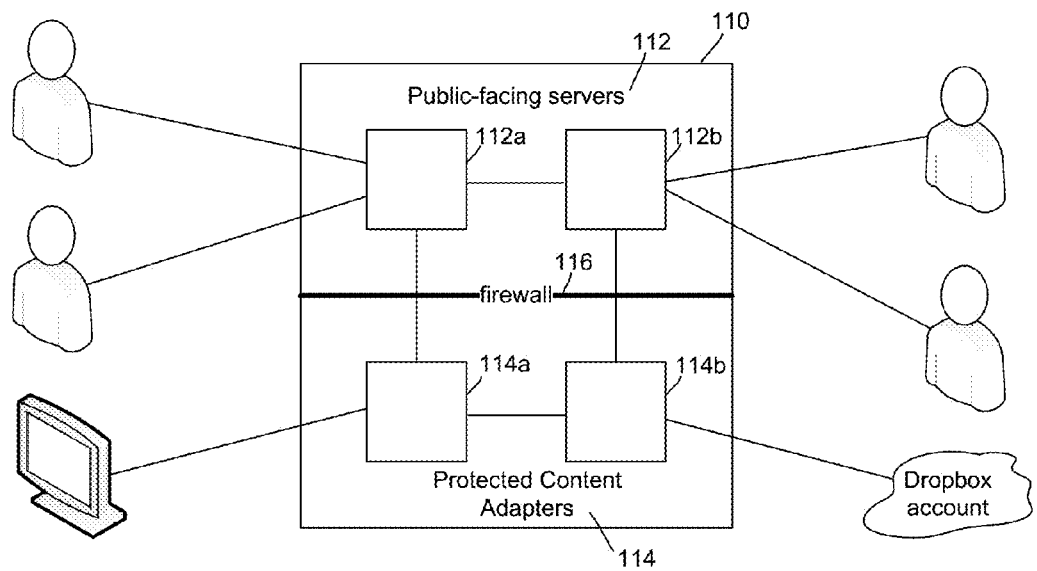
FIG. 9 is a schematic diagram showing the architecture of a central service administrator employed in the embodiment of the virtualized content access system.
Figure 10:
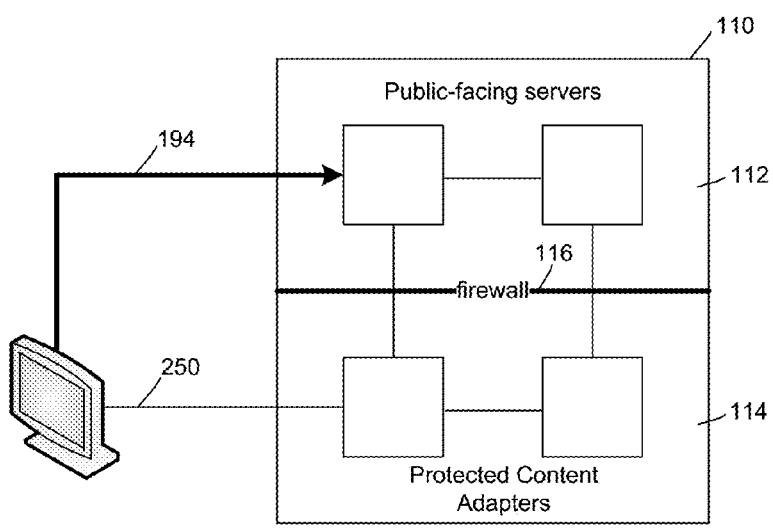
FIG. 10 is a high-level schematic diagram showing connections between content provider and the central service administrator employed in the embodiment of the virtualized content access system.

The central service administrator 110 is preferably organized as a cluster. It is helpful to understand the organization of the central service administrator cluster prior to detailed discussions of the activation process since the two are interrelated. Referring to FIGS. 9 and 10, the cluster includes two major components: at least one public facing central service administrator web server 112 which is responsible for communicating with users of the VCA system via CDs, and at least one content adapter (CA) 114 which is responsible for accessing content from remote content providers. The public facing central service administrator web servers 112 are separated from the content adapters 114 by a firewall 116 in order to protect the latter in the event that the public facing web servers 112 are compromised.

The content adapters 114 possess encryption keys (e.g., using AES256 symmetric encryption) used to encrypt and decrypt important content source data such as passwords in the case of FTP servers and authorization tokens for cloud data sources. It is important that end users not be able to access such data, and a hard separation of hardware is the best defense. The firewall 116 does not accept any incoming connections except from the public facing web servers 112 and the passive content servers 120.

The passive content server 120 only establishes persistent HTTPS connections 194 outbound to ensure the passive content server can bypass most network security appliances. Because the content adapters 114 are protected, a persistent HTTPS connection cannot be made to them over standard ports (443). Instead, as seen in FIG. 10, the persistent connection 194 is made to one of the public facing central service administrator servers 112. The transfer of data (and metadata) is made between the passive content server and the content adapter (via line 250).

3.2.3 Activation Workflow

Activation begins with a registered user selecting to add a content provider to a VCA collection. Assuming a private content provider, the user will be presented with a screen, such as screen 216 seen in FIG. 11, providing an activation code 340.

The central service administrator 110 randomly generates the activation code. When the system generates this code, a temporary record is inserted into an authorization code table, such as table 342 seen in FIG. 2A.

Figure 12:
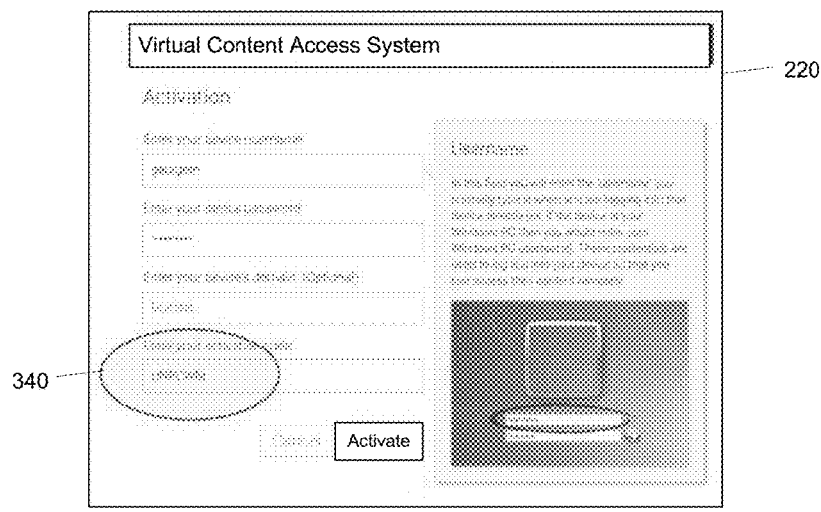
FIG. 12 is a is an image of a screen display associated with the graphical user interface employed by the embodiment of the virtualized content access system, relating to contribution of content repository to the system.

When activating, the registered user enters the operating system credentials that will be utilized during content access, as seen for example in screen 220 of FIG. 12. This maps the email-based VCA system account to an operating system account on the target content provider, whereby the user is restricted to accessing only the content available to that account on that operating system. The user also enters the provided activation code 340.

Once the user clicks activate, the passive content server 120 proceeds to make the following requests of the central service administrator 110, with the goals of:

1. Confirming the activation code, in return for a DID (device identifier) 192.

2. Requesting a redirection URL to which a persistent connection should be established.

3. Establishing a persistent connection 194 between the passive content server 120 and one of the public facing web servers 112.

Figure 14:
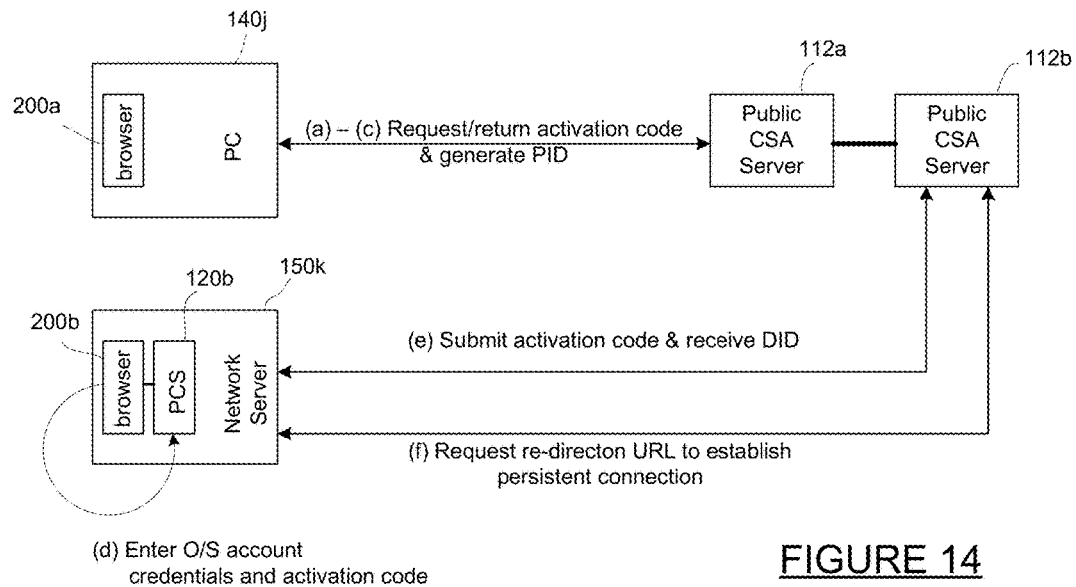
FIGS. 14, 15 and 16 are schematic diagrams illustrating connection flows pursuant to the workflow shown in FIG. 13.
Figure 15:
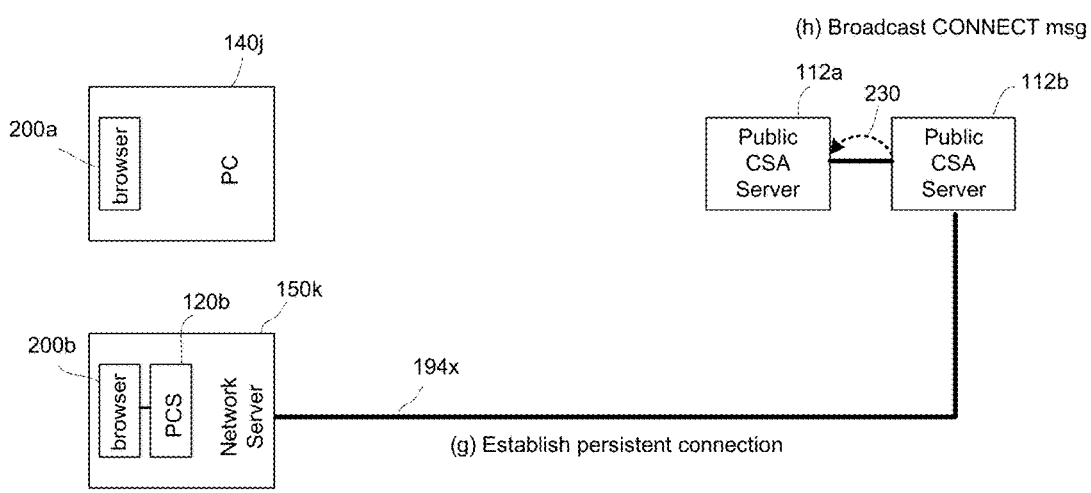

FIG. 13 shows a complete workflow 350. FIGS. 14-15 diagrammatically illustrate various actions by various actors in the workflow 350. Note that this process can invoke two GUI instances 200a, 200b on two different devices. The first GUI instance, referred to below as 'browser1', communicates with and opens an activation page on the central service administrator 110, such as shown FIG. 11, while the second instance, referred to below as 'browser2', opens and communicates with an activation page on the passive content server 120, such as shown in FIG. 12. Note also that the user and passive content server may connect to different servers in the cluster of central service administrator 110.

The workflow procedure is:

(a) Referring to steps 351-352 and FIG. 14, using machine 140j, the user opens browser1 200a to the public facing server 112a of the central service administrator 110 over HTTPS, and selects to add a new content provider, such as network server 150k. The user is connected to the public facing central service administrator server 112a.

Figure 11:
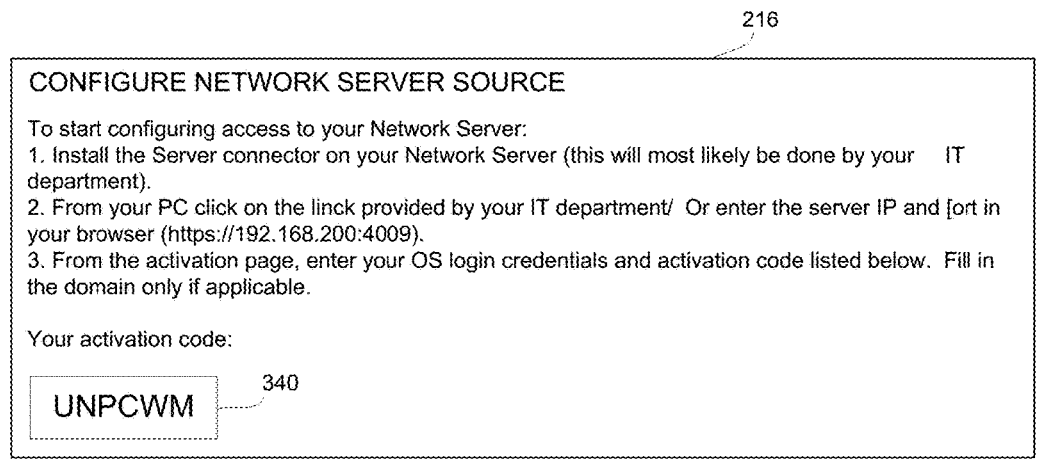
FIG. 11 is a is an image of a screen display associated with the graphical user interface employed by the embodiment of the virtualized content access system, relating to a process for contributing a content repository to the system.

(b) Referring to steps 353-355 and FIG. 14, the public facing central service administrator server 120a generates a short activation code and stores it in the auth code table 342 described earlier. The activation code is displayed in browser1 200a, e.g., as shown in FIG. 11.

(c) Referring to steps 356-358 and FIG. 14, a request is made by browser1 200a to the public facing central service administrator server 112a to create a content provider object and wait for a passive connection to be established after activation. At this time the public facing central service administrator server 112*a* generates a DID 192*x* and enters a PID 182*x* in the relational database 180 with respect to the requesting user, as discussed earlier.

(d) Referring to steps 359-365 and FIG. 14, the user communicates with passive content server 120*b* installed on network server device 150*k* via browser2 200*b*. The browser2 200*b* opens a passive content server activation page for a local network server, which page can resemble page 220 of FIG. 12. The user enters his or operating system credentials for accessing the network server 150*k* as well as the activation code, and clicks an 'activate' button in the browser2 200*b*.

(e) Referring to steps 366-368 and FIG. 14, the passive content server 120*b* calls on a second public facing central service administrator server 112*b* to confirm the entered activation code is valid, and receives the DID 192*x* in response. Note that in this example the passive content server 120*b* is on a different network than the machine 140*j* executing browser1 200*a* so a load balancer in the central service administrator 110 directs the passive content server 120 to another server (112*b*) in the cluster. At step 369, the public facing central service administrator server 112*b* deletes the activation code from the authorization code table 342. At steps 370-371 passive content server 120*b* stores the DID 192*x* against the user credentials so that a thread may be launched in the passive content server 120*b* when content is requested using the correct credentials for the specified DID 192*x*.

(f) Referring to steps 372-374 and FIG. 14, the passive content server 120*b* calls/redirect on the public facing central service administrator server 112*b* to receive a URL to which the passive content server 120*b* should establish its persistent connection 194*x*.

(g) Referring to steps 375-377 and FIG. 15, the passive content server 120*b* calls/connects on the public facing central service administrator server 112*b* (or whatever alternative URL was returned previously) to establish the persistent connection 194*x*. The DID 192*x* is entered into a map (not shown) to associate the socket or connection with a DID for future messaging. In a preferred implementation, a one-time token is generated by the central service administrator 110 during the redirection phase of activation. The token is stored (not shown) in the database 180 along with the matching DID 192*x* and its activating UID. That token is returned to the passive content server 120*b*. When the passive content server 120*b* establishes the persistent connection 194*x*, it passes the DID 192*x*, and the one-time token. This token is removed from the database 180 by the central service administrator 110 during the establishment of the persistent connection 194*x*. If the DID 194*x* and token combination do not match, the connection 194*x* is refused.

(h) Referring to steps 378 and FIG. 15, a CONNECT message 230 is broadcast from the public facing server 112*b* across the central service administrator cluster telling all public facing servers 112 that the specified DID 192*x* has established its persistent connection. At step 379 the public facing central service administrator server 112*a* receives the CONNECT message 230 and . . .

Figure 16:
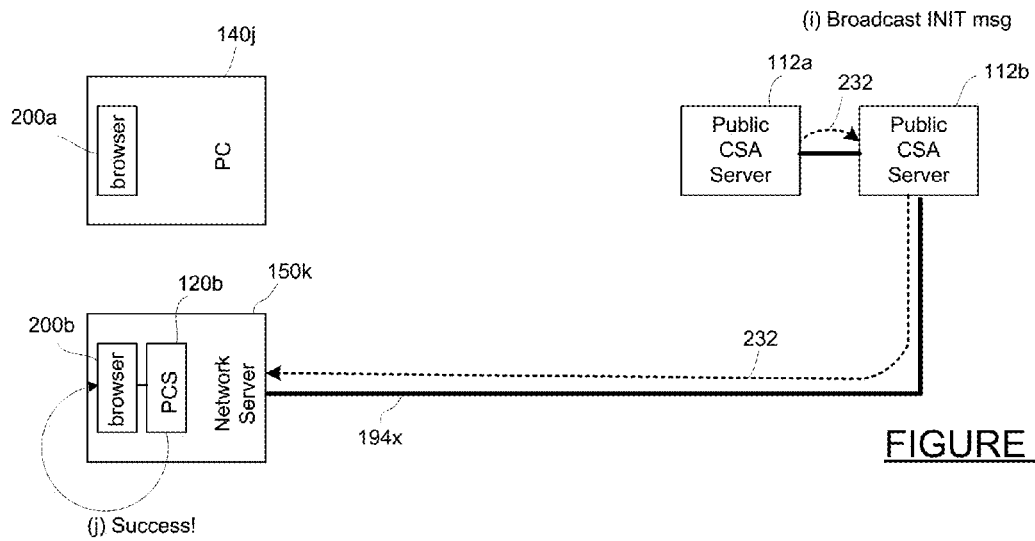

(i) referring to steps 380-382 and FIG. 16, the public facing central service administrator server 112*b* sends an INIT message 232 to the passive content server 120*b* using the persistent connection 194*x*. The activation process started in step 366 is now complete, and the response is delivered.

(j) The user will see a success message returned in browser2 200*b*.

It should be appreciated that the user account credentials or log-in information never leaves the passive content server 120*b* and its corresponding machine 150*k*.

In the foregoing example, two machines 140*j*, 150*k* executing two web browser instances 200*a*, 200*b* were utilized to contribute and activate a content provider in a VCA collection. It should be appreciated that a single machine utilizing a single browser instance could be employed in the alternative. For example, the initiating request could be made from the browser 200*b* on network server 150*k*. In this case, the activation code 340 could be delivered to activation web page 220, omitting intervening authorization page 216.

3.2.4 Lost Connections

In the event a content provider is restarted or the persistent connection 194 is lost, the passive content server 120 can re-establishes a persistent connection with the public facing central service administrator server 112 pursuant to steps 372-380.

3.3 Downloading Content

Once persistent connection 194 is established, the VCA system 100 can start fetching content from the corresponding remote content provider via its passive content server 120.

The persistent connection is utilized to send messages from the central service administrator 110 to the connected passive content server 120.

Figure 17:
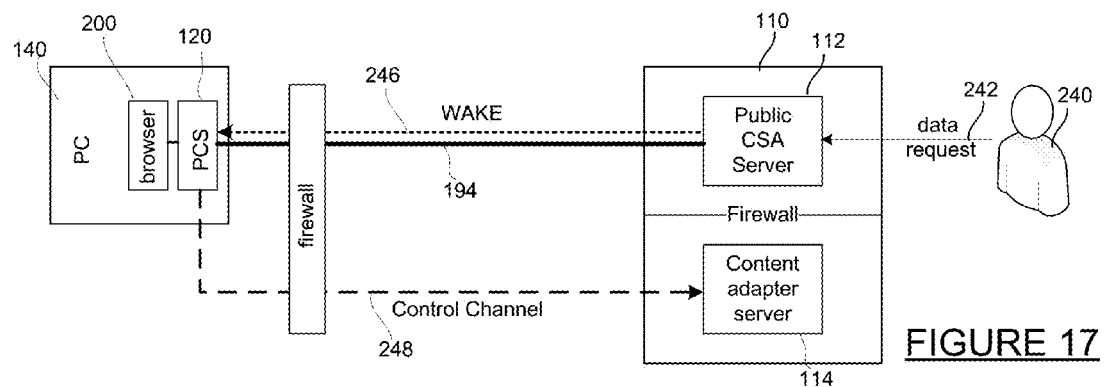
FIGS. 17 and 18 are schematic diagrams illustrating a workflow and connection flows which enable a user of the embodiment of the virtualized content access system to access content contributed to the system.

Referring additionally to FIG. 17, when a consumer 240 requests (ref. no. 242) data from a passive content server 120, the central service administrator 110 signals the remote passive content server 120 by delivering a WAKE message 246 across the persistent connection 194 to the remote content provider, e.g., PC 140. The WAKE message 246 includes a URL to which a control channel 248 should connect, as seen in FIG. 17. The URL preferably points to one of the content adapters 114, rather than one of the public facing web servers 112.

The control channel 248 can employ a proprietary SSL-encrypted TCP data stream to send control requests from the central service administrator 110 to the passive content server 120. Like the persistent connection 194, the direction of connection establishment is reversed, and is initiated from the passive content server 120 as seen in FIG. 17 to avoid firewall denials. The control channel 248 is semi-persistent in that it lasts as long as there are requests to be made before a configured timeout occurs. All requests targeting the associated DID (and therefore the remote operating system user) can be 'controlled' by this same control channel instance until it times out.

Figure 18:
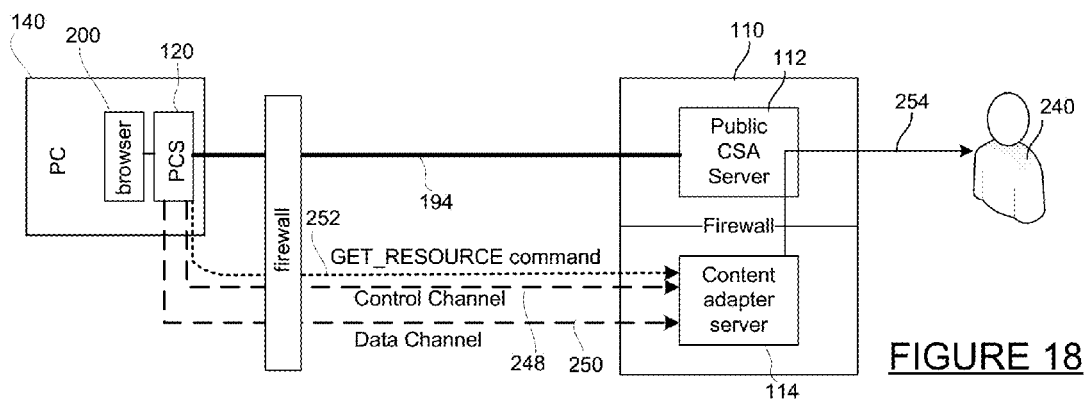

Once the control channel 248 is established, the content adapter server 114, in response to consumer requests made through the GUI dashboard 200 to navigate through repositories or to access content therefrom, may issue commands to fetch metadata (e.g., a GET_CHILDREN command, which returns downstream directory structure), or to download files, e.g., via a GET_RESOURCE command 252 as seen in FIG. 18. Those commands include the necessary path information that the passive content server 120 will need to locate the actual file on the content provider such as the PC 140. Commands are issued in a request>response cadence, and include an incrementing request ID (RID) allowing the central service administrator 110 to match request data to response data.

In the case of the GET_RESOURCE command 252 (to download a file), the passive content server 120 preferably opens a new data channel connection 250, as seen in FIG. 18, which can employ a proprietary SSL encrypted TCP data stream to transfer files. Once the data channel with a matching RID is established on the content adapter 114, the central service administrator 110 will "pull" data from the remote passive content server 120 until end of file marker is reached.

The downloaded data is relayed in substantially real time from the originating content adapter server 114 through the central service administrator cluster to the consumer user's public facing web server 112. A pending (unfulfilled) GET request to download will already have been initiated by the consuming user, and it is fulfilled by the incoming content adapter data. The data is thus streamed to the consumer 240 and downloaded, as schematically represented by line 254.

When the download is complete, the data channel 250 is closed. New downloads will initiate a new data channel.

4.0 Sharing Content

The VCA system 100 preferably enables registered users to share content with other registered or unregistered users. The VCA system 100 preferably operates in accordance with the following security objectives:

(i) the content remains in its original location;

(ii) the content owner needs to provide explicit permission to a recipient prior to the latter's access;

(iii) the recipient/sharee is validated as to whom they claim to be; and (iv) no details about the underlying data storage system or content provider are revealed to the recipient.

Figure 19:
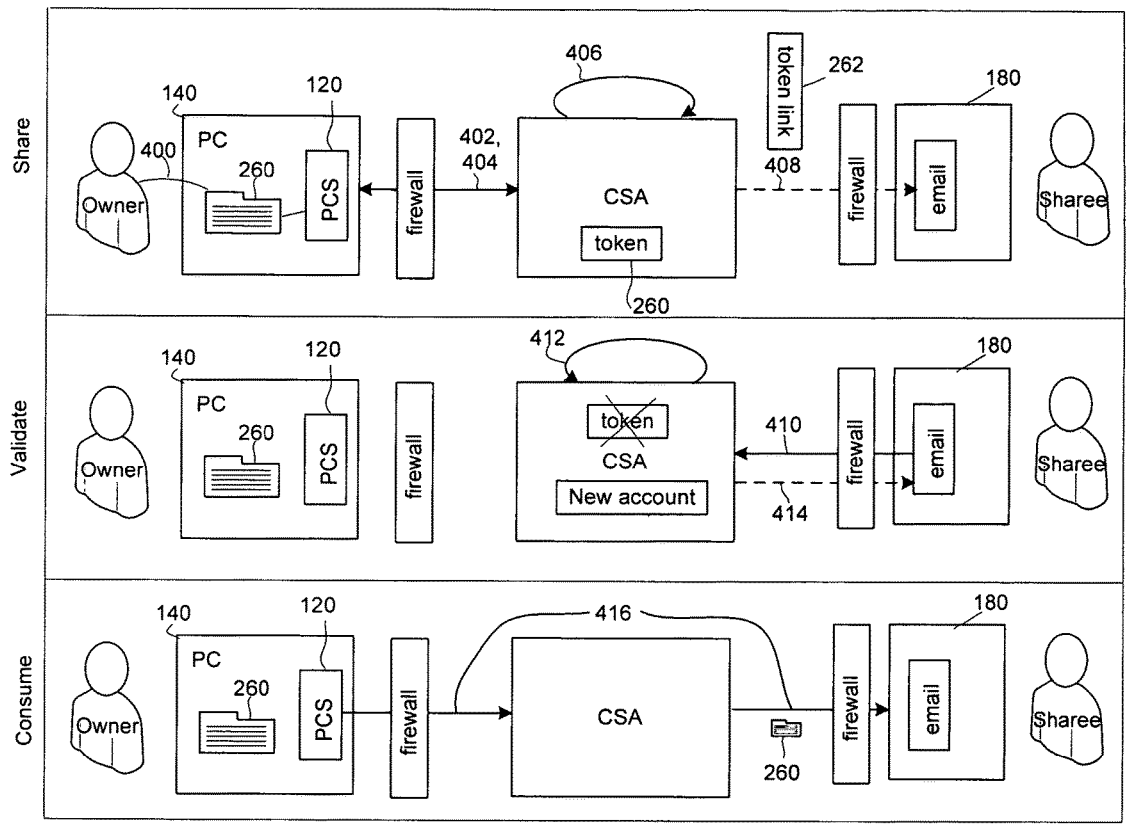
FIG. 19 is a series of schematic diagrams illustrating a workflow and connection flows which enable a sharee of the embodiment of the virtualized content access system to access content shared by a registered user of the system.

FIG. 19 illustrates a high-level workflow that ensures recipients are properly validated prior to data access, to ensure that only the intended recipient can access the data.

The overall sharing workflow may be described as follows, with respect a non-system-validated user or new sharee accessing content for the first time:

Step 400—the content owner ('owner', e.g., registered user George) locates some content 260 to share in one of his or her defined content providers such as PC 140.

Step 402—the owner uses the GUI 200 to share that content with an email contact ('sharee', e.g., Alex). For example, in GUI window 204 of FIG. 3A, the owner can select to share the "documents" folder by checking the corresponding checkbox 206 and clicking on the share icon 208. Actuating the share icon 208 can bring up a list of, or a search box for finding, known contacts stored by the VCA system, or alternatively allow the owner to identify a new contact via email address or other identifier.

Step 404—The share is communicated with the central service administrator 110. In the case of a new share, as seen in FIG. 2B, the central service administrator 110 generates in a contact record 442 in a contact table 440 for the new sharee (CID 444) which is associated with the owner by his or her UID 184. (In the case of a previously known sharee, this step may be omitted.)

Step 406—the central service administrator generates a temporary one-time use token 260 to be consumed by the sharee.

Step 408—an email is sent to the sharee ('Alex', in this example) which includes a link 262 back to the central service administrator 110 for consumption of the one-time use token 260.

Step 410—The sharee clicks the email link 262 on communication device 180, consuming the one-time-use token 260.

Step 412—a VSA system account is generated for the sharee, and assigned a randomly generated password. The sharee's account is now validated, and is logged in automatically.

Step 414—the password is emailed to the sharee for later use.

(Note that steps 412 and 414 would be omitted for a sharee previously recorded by the VCA system. Instead, the pre-existing sharee would log into the VCA system using a previously registered password.)

Step 416—the sharee downloads the shared content 260 in a manner similar to that discussed above with reference to FIGS. 17 and 18.

4.1 Contact Addition

Prior to sharing content from a contributed content provider, the registered user/sharer can define a set of contacts with whom he or she may wish to share content. Those contacts can be linked to the user in the central service administrator relational database 180 as contacts, with the contact's email being the primary tool used for delivering share notifications, and for account validation to ensure the recipient is who they say they are.

More particularly, as seen in FIG. 2B, each contact (potential target user) receives an entry in a 'contacts' table 440 associated with the content owner's UID 184. Contacts do not yet necessarily have a VCA system account, so may not yet consume content. For this purpose, a contact record 442 can have a "Has_Account" flag 448 which indicates whether or not the contact has a fully validated VSA system account (yet). Once the user has been validated, the "Has_Account" will be set to True, and the sharee will then have a full VCA account.

4.2 Recipient Validation

Figure 20:
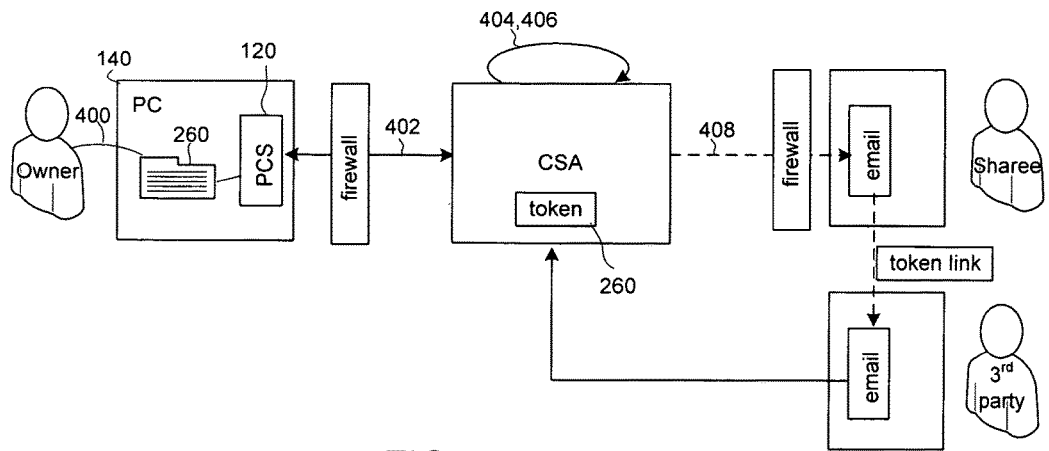
FIG. 20 is a schematic diagram illustrating a risk inherent in link sharing.

The VCA system 100 preferably authenticates target users to ensure that unauthorized link sharing between the intended recipient and an unknown (to the owner) third party cannot result in the unintended access of the owner's data. The diagram of FIG. 20 illustrates the danger of "link-based" sharing wherein, for example, the sharee ('Alex' in the example above) forwards the email received in step 408, which includes the link 262 to the one-time-use token 260, potentially enabling the third party to access the content-owner's content with the content owner being unaware of the downloader's identity. The unknown third party user in FIG. 22 should not be able to access the owner/sharer's content ('George' in the example above). To achieve this, the intended recipient's email can be validated with a temporary one-time-use token. Once validated, an account password is emailed to the share, who would be required to use the password in order to log into the VCA system to access the shared content. The unknown third party user will not be able to access the content even with the original email link since the third party user will not have the required password.

Validation can involve sending an email incorporating a one-time use code to a known contact's email address. Once the link is clicked, the code is consumed and the account is created on behalf of the sharee. A password is then emailed to the sharee.

An example of a format for the temporary, short-lived validation data is shown in table 450 of FIG. 2C. The table 450 includes the following fields:

Code—The activation code contained within a link in the email delivered to the sharee.

Email—The email address of the target sharee.

Created—The date the temporary code was created.

Expires—The date the temporary code expires.

Name—The name of the target sharee.

FromUID—The email of the sharer.

Once consumed, the values in this table 450 are used to create a new user record in the relational database 180 for the sharee, comprising the email and name stored within it. A contact for the sharer is automatically generated from the values stored in this same row.

4.2.1 First Time Automatic Login

Once the sharee has confirmed his or her email account by clicking on the link 262, a password is then emailed to the sharee as indicated in step 414 of FIG. 19. Usually, the sharee must enter this password in order to log in. However, since this is a barrier to entry, the process can be optimized on first use after the email click. More particularly, since the account was validated after the sharee was redirected to the central service administrator 110, the central service administrator 110 can immediately render the new sharee's session live, and allow the sharee to consume the content. In this way, logging in can be skipped in this special first-time case. Subsequent logins may require password entry.

Figure 3C:
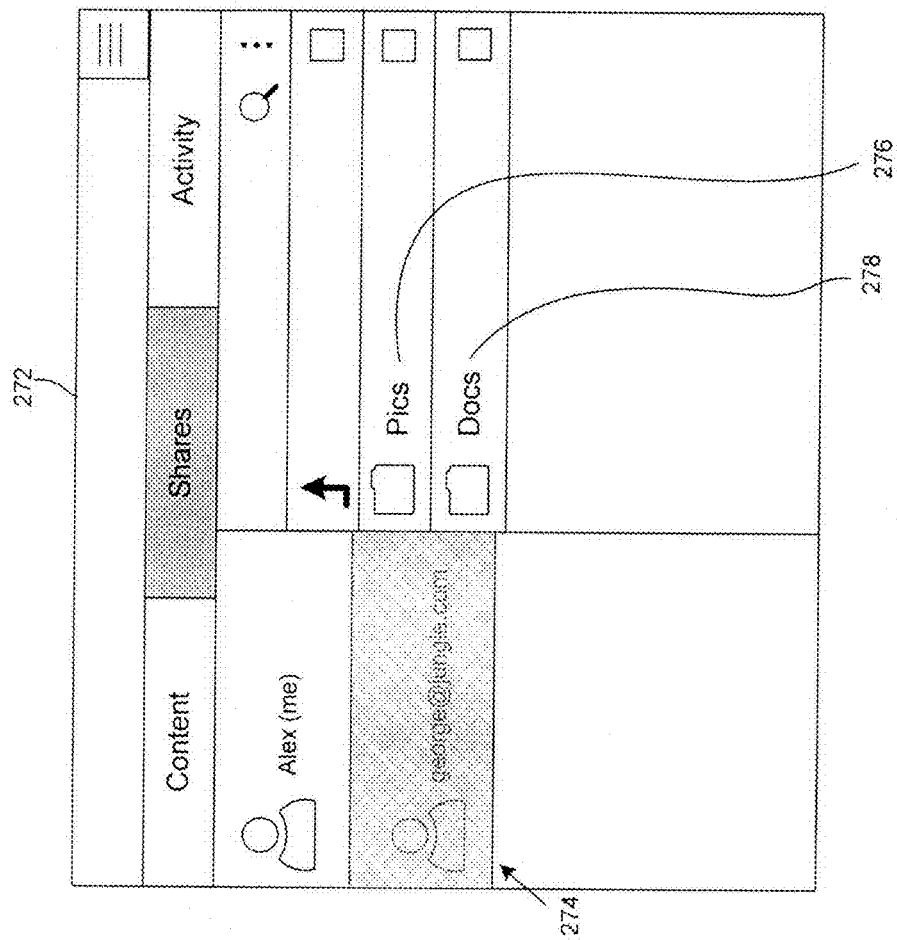
Figure 3B:
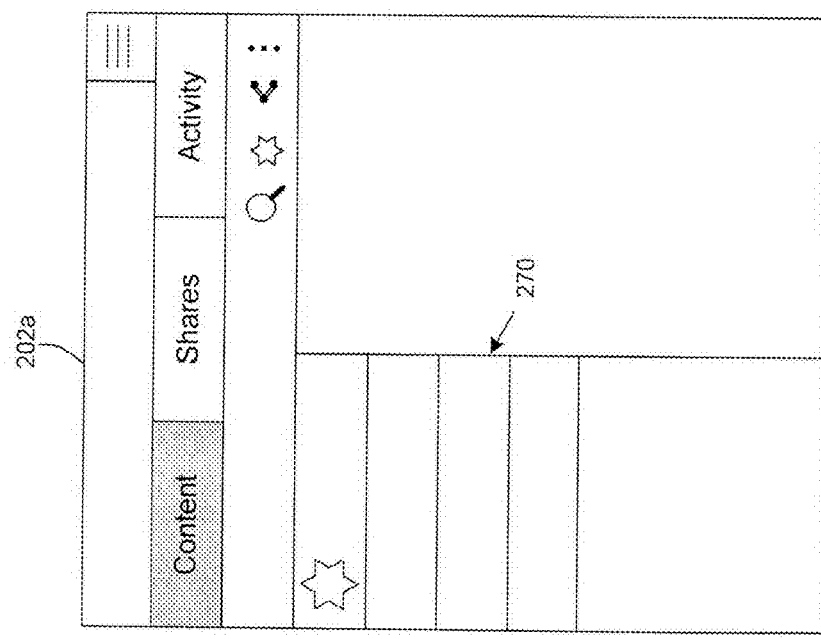

Once logged in, the sharee has access to the GUI 200 via the public facing web server 112. There is no need at this point for the sharee to load a passive content server 120 into whatever private infrastructure communication device the sharee may use to access the content shared by the sharer. FIG. 3B shows an initial GUI window 202a that may be seen by the sharee. At this point, the sharee has not contributed any of his or her content to a VCA collection so no content repositories are listed under content data 270. However, as seen in the GUI window 272 of FIG. 3C which shows share data 274, the sharee ('Alex', in our example) has access to content shared by the registered user ('George', in our example) who has shared two folders 276, 278 named 'Pics' and 'Docs', respectively. The sharee may access these folders by clicking on them which will lead to a subsequent screen showing the contents of the folders, which content may be opened, downloaded or streamed, depending on the type of content and user commands.

The sharee may contribute his or her own content repositories to his or her VCA collection as discussed previously.

4.3 Shared Content Abstraction

The sharing mechanism of the VCA system 100 preferably keeps the specifics of the owner's content repository hidden from the sharee. Preferably, the sharee should not know the content source type, e.g., the sharee should not know if the content is, for example, coming from a PC or a public cloud service. Preferably, the sharee should also not know the structure of the content source—only relative paths should be revealed, not the entire structure.

4.3.1 Content Access Abstraction

In order to mask the content source type, all content providers may provide meta-information such as file name, through an abstract programmatic software interface. The client application accesses any shared data in exactly the same manner regardless of the underlying content repository type.

Figure 21:
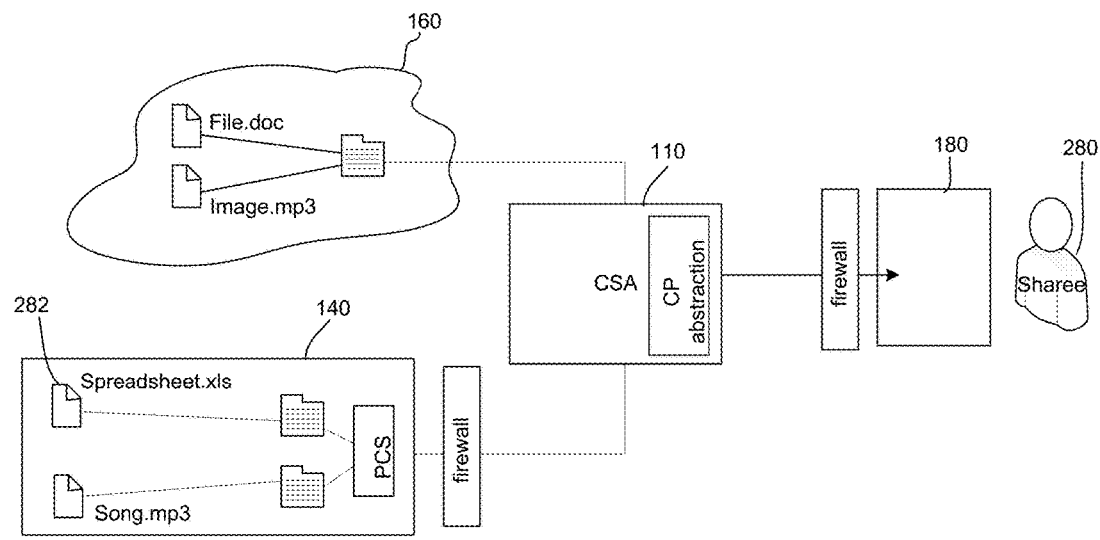
FIG. 21 is a schematic diagram illustrating distributed content contributed to the embodiment of the virtualized content access system.

FIG. 21 illustrates that a sharee 280 has no idea where a shared spreadsheet 282 that he is downloading is coming from—it could be from a public cloud 160, an office PC 140, or any other type of content provider.

4.3.2 Virtual Path Mapping

In order to hide the underlying file structure from the sharee, the VCA system 100 can utilize virtual path mapping, in which only relative paths are sent to the sharee, along with the share ID. The system de-references the share ID to locate the real path, and then translates the virtual path to a real path. The end result is the sharee has no understanding of where in the file system of the shared content repository the content is coming from.

Figure 22:
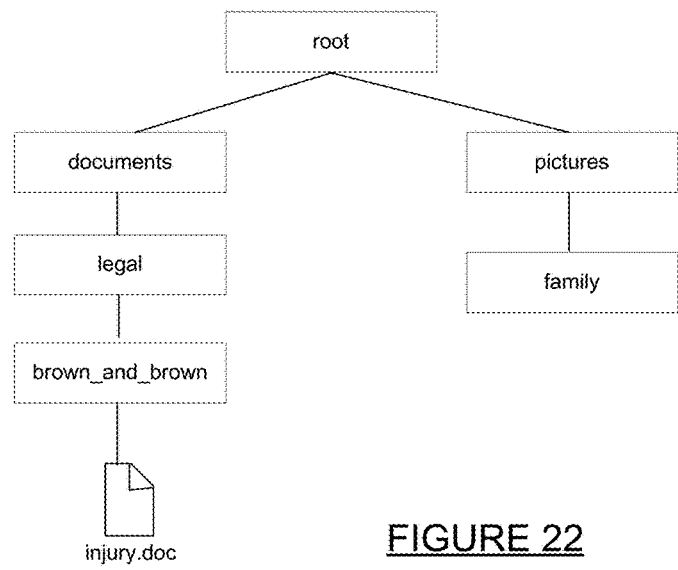
FIG. 22 is a schematic diagram of a directory structure.

The diagram in FIG. 22 provides an example of the information that would inadvertently be provided to the sharee if path mapping were not used. Assuming that the file "injury.doc" were shared as the root, the sharee should not see "brown_and_brown" since that would reveal the law firm's name. In this example, the real path would be: /documents/legal/brown_and_brown/injury.doc, while the virtual path is /injury.doc.

Given a virtual path /injury.doc, and the share ID, the system will be able to convert that into a real physical path that will be utilized to fetch and deliver the file.

4.4 Share Storage

Shares are subsets of provider content—for example individual files or folders, associated with the provider's PID identifier 182. Each share (for example a folder) is associated with a set of sharees, some of which will have validated accounts and can access the content.

FIG. 2D shows an example of provider share data table 460 maintained in relational database 180. The fields include:

SID 462—a share ID built from the real provider path that uniquely identifies the location of the shared resource in the remote content repository. (In this example the SID ab3c/5def appears indecipherable due to the ID-based path segment naming in cloud providers.)

PID 182—the provider ID identifying the content repository.

Virtual 464—a virtualized display path shown to the sharee

Sharee—A list of sharees, via UIDs 184, which have access to the indicated content.

The shares are stored with the owner rather than with the sharee. When the sharee logs in to the public facing web server, the contact table 440 can be de-referenced to locate any potentially available shares.

4.5 Share Transmission

A sharee communication device preferably receives content in a manner similar to that shown in FIGS. 17 and 18 and described above in section 3.3.

5.0 Benefits

The VCA system is a form of a distributed file system. However, unlike conventional distributed file access systems the VCA system is interoperable amongst various proprietary file storage systems enabling users to obtain access to substantially all of their content from any content provider using any Internet-enabled device.

The invention, therefore, is rooted in improving existing computer-related technology, and more specifically, file access. With existing systems user content is distributed over a wide range of devices and operating systems, including public infrastructure. Users have no centralized mechanism to directly and reliably access this distributed content using a consistent set of credentials without duplicating a potentially vast amount of data. Furthermore, some of that content is protected by operating system credentials, while other content is not. The user also has no mechanism with which to universally share that content with authenticated individuals. The VCA system uses a distributed architecture to provide a content aggregation framework that abstracts access into a plurality of content sources, yielding the following improvements to existing computer-related technology: (i) it enables access to distributed content directly without requiring a copy of the data, thereby decreasing latency and minimizing processing and storage load; (ii) it respects the underlying credentials of the content hosting environment by requiring the owner to authenticate using the credentials; (iii) it utilizes common mechanisms such as email to centralize authentication of the owner; (iv) it utilizes the same authentication mechanism to authenticate any sharees; and (v) it employs connection reversal strategies to allow for the easy passing of connection through most consumer firewalls and networking appliances thereby simplifying configuration.

Those skilled in the art will appreciate that various alternations and modifications may be made to the embodiments described herein without departing from the scope of the appended claims.

The invention claimed is:

1. A virtualized content access (VCA) system, comprising:
   a central service administrator (CSA), which is configured to enable a user to register a VCA account with the CSA;
   a plurality of private infrastructure content providers (PICPs), wherein each PICP includes a passive content server (PCS) and at least one operating system (O/S) account repository containing content, wherein at least two of the PICPs are disparate from one another in that the at least two PICPs are located in different Internet domains and utilize different operating systems;
   wherein the CSA and the PCSs are configured to (i) enable a registered user to select at least two O/S account repositories from at least two disparate PICPs for inclusion in a VCA collection associated with the registered user, and (ii) establish, for each O/S account repository selected for inclusion in the registered user's VCA collection, a persistent connection between the CSA and the PCS corresponding to each selected O/S account repository;
   wherein the CSA maintains a relational database associating registered users' selected O/S account repositories and the persistent connections corresponding thereto;
   wherein the registered user can utilize a communication device (CD) to connect to the CSA over the Internet and, upon VCA account authentication, receive a list of the O/S account repositories in the registered user's VCA collection and request content therefrom, and wherein, in response to the request, the CSA identifies the PCS and the persistent connection associated with each O/S account repository containing the requested content and signals the identified PCS over the identified persistent connection to initiate transfer of the requested content from the identified PCS to the registered user's CD.

2. A VCA system according to claim 1, wherein any of the plurality of PICPs is any one of: a personal computer; a network server, a network attached storage device; a storage attached network; a router or network appliance.

3. A VCA system according to claim 1, wherein the persistent connections are established outbound from the PCSs to the CSA.

4. A VCA system according to claim 3, wherein the CSA is a cluster comprising at least one public facing (PF) server and at least one content adapter (CA) server, the at least one PF server accepting connections from the public including registered users, the at least one CA server not accepting connections from the public, wherein the at least one PF server and the at least one CA server are provisioned on two separate machines separated by a firewall which inhibits the at least one CA server from receiving connections other than from the at least one PF server and the PCSs.

5. A VCA system according to claim 4, wherein, the registered user's CD is connected to one of the at least one PF servers and wherein, in retrieving the requested content, the connected-to PF server transmits a wake signal to the identified PCS over the identified persistent connection, wherein the wake signal includes a URL pointing to one of the least one CA server, and wherein upon receipt of the wake signal, the identified PCS opens a semi-persistent control channel to the pointed-to CA server.

6. A VCA system according to claim 5, wherein the semi-persistent control channel elapses after a pre-configured time-out period.

7. A VCA system according to claim 5, wherein the pointed-to CA server issues a metadata command to the identified PCS over the semi-persistent control channel to retrieve metadata associated with the requested content, and wherein, in response to the metadata command, the identified PCS transmits directory path information over the semi-persistent control channel to the pointed-to CA server, the pointed-to CA server transmits the directory path information to the connected-to PF server, and the connected-to PF server transmits the directory path information to the registered user's CD.

8. A VCA system according to claim 5, wherein the requested content includes a file, and wherein the pointed-to CA server issues a command to the identified PCS over the semi-persistent control channel to retrieve the file, wherein upon receipt of the file retrieval command, the identified PCS opens a data channel connection to the pointed-to CA server and transmits the file to the pointed-to CA server over the data channel, the pointed-to CA server conveys the file to the connected-to PF server, and the connected-to PF server transmits the file to the registered user's CD.

9. A VCA system according to claim 8, wherein a data channel connection is opened per file retrieval command.

10. A VCA system according to claim 1, including a public cloud storage system, wherein:
    the public cloud storage system includes account repositories that are access-controlled by security credentials associated with a public cloud system account;
    the CSA is configured to enable a registered user to select one or more public cloud storage system account repositories for inclusion in the registered user's VCA collection; and
    the CSA maintains associations in the relational database between registered users and authorization tokens that enable access to registered users' public cloud storage system account repositories.

11. A VCA system according to claim 1, wherein the CSA enables the registered user to select shareable content in the registered user's VCA collection to share with one or more sharees, and wherein, upon selection, the CSA sends an email to a sharee with a URL link pointing to the CSA for retrieving the shareable content or associated metadata.

12. A VCA system according to claim 11, wherein a new sharee who is not registered with the VCA system retrieves the shareable content by activating the URL link without having to register with the VCA system.

13. A VCA system according to claim 12, wherein the CSA establishes a VCA account for the new sharee with a temporary password which is transmitted to the new sharee, and the new sharee is required to use the password or a replacement therefor to subsequently retrieve the shareable content.

14. A VCA system according to claim 11, wherein, when the URL link is activated by a sharee communication device (CD), the CSA identifies the PCS (share-identified PCS) and the persistent connection (share-identified persistent connection) associated with the O/S account repository containing shareable content and signals the share-identified PCS over the share-identified persistent connection to initialize transfer of the shareable content from the share-identified PCS to the sharee CD.

15. A VCA system according to claim 14, wherein the CSA is a cluster comprising at least one public facing (PF) server and at least one content adapter (CA) server, the at least one PF server accepting connections from the public including registered user CDs and sharee CDs, the at least one CA server not accepting connections from the public, wherein the at least one PF server and the at least one CA server are provisioned on two separate machines separated by a firewall which inhibits the at least one CA server from receiving connections other than from the at least one PF server and the PCSs.

16. A VCA system according to claim 15, wherein the sharee CD is connected to one of the at least one PF servers, and wherein, in retrieving the shareable content the connected-to PF server transmits a wake signal to the share-identified PCS over the share-identified persistent connection, wherein the wake signal includes a URL pointing to one of the at least one CA server, and wherein upon receipt of the wake signal, the share-identified PCS opens a semi-persistent control channel to the pointed-to CA server.

17. A VCA system according to claim 16, wherein the pointed-to CA server issues a command to the share-identified PCS over the semi-persistent control channel to retrieve metadata associated with the shareable content, and wherein, in response to the metadata command, the share-identified PCS transmits relative directory path structure over the semi-persistent control channel to the pointed-to CA server, the pointed-to CA server transmits the relative directory path structure to the connected-to PF server, and the connected-to PF server transmits the relative directory path structure to the sharee CD.

18. A VCA system according to claim 17, wherein the shareable content includes a file, wherein the pointed-to CA server issues a command to the share-identified PCS to transfer the file, wherein, in response to the file transfer command, the share-identified PCS opens a data channel connection to the pointed-to CA sever and transmits the file to the pointed-to CA server over the data channel, wherein the pointed-to CA server conveys the file to the connected-to PF server, and the connected-to PF server transmits the file to the sharee CD.

* * * * *